United States Patent
Yang et al.

(10) Patent No.: US 11,252,337 B1
(45) Date of Patent: Feb. 15, 2022

(54) METHOD AND APPARATUS OF PERFORMING AUTOMATIC EXPOSURE CONTROL FOR IMAGE SENSOR WITH CONTEXT SWITCHING

(71) Applicant: Himax Imaging Limited, Tainan (TW)

(72) Inventors: Wei-Chieh Yang, Tainan (TW); Po-Chang Chen, Tainan (TW); Po-Fang Chen, Tainan (TW)

(73) Assignee: Himax Imaging Limited, Tainan (TW)

( * ) Notice: Subject to any disclaimer, the term of this patent is extended or adjusted under 35 U.S.C. 154(b) by 0 days.

(21) Appl. No.: 17/136,046

(22) Filed: Dec. 29, 2020

(51) Int. Cl.
*H04N 5/235* (2006.01)

(52) U.S. Cl.
CPC ......... *H04N 5/2353* (2013.01); *H04N 5/2351* (2013.01)

(58) Field of Classification Search
CPC ........................... H04N 5/2353; H04N 5/2351
See application file for complete search history.

(56) References Cited

U.S. PATENT DOCUMENTS

| | | | | |
|---|---|---|---|---|
| 9,343,177 B2 * | 5/2016 | Malone | ................... | G06F 13/00 |
| 9,386,232 B2 * | 7/2016 | Makino | ................ | H04N 5/2353 |
| 2019/0141274 A1 * | 5/2019 | Hizume | ............... | H04N 5/3745 |

\* cited by examiner

*Primary Examiner* — Luong T Nguyen
(74) *Attorney, Agent, or Firm* — Winston Hsu (57) ABSTRACT

A method for controlling an image capturing device that is operated according to a startup signal includes: configuring an image sensor array of the image capturing device by a first context to output a high-resolution image with a relatively long exposure time to a post-device; switching the first context to a second context based on the high-resolution image and a wide convergence zone; configuring the image sensor array by the second context to output one or more low-resolution images with relatively short exposure times in order to update an exposure value based on the low-resolution images; and updating the exposure value based on a narrow convergence zone to configure the image sensor array.

15 Claims, 6 Drawing Sheets

METHOD AND APPARATUS OF PERFORMING AUTOMATIC EXPOSURE CONTROL FOR IMAGE SENSOR WITH CONTEXT SWITCHING

BACKGROUND OF THE INVENTION

1. Field of the Invention

The present invention relates to automatic exposure control for image sensors, and more particularly to methods and apparatuses for automatic exposure control on an image sensor with context switching.

2. Description of the Prior Art

Automatic exposure (AE) is a standard feature on digital cameras that is used to compensate for limited dynamic ranges of image sensors. The AE can automatically calculate and manipulate camera exposure setting (e.g. exposure time, sensor gain) in order to provide either: (a) visually pleasant images for human viewing or (b) suitable images for computer vision tasks (e.g. face recognition, object/motion detection). In addition to providing well-exposed images, it is also important to have a fast exposure control to shorten the time required by getting a well-exposed image once abrupt light change occurs (e.g. light off/on)

Typically, the image sensor is configured to output low-resolution images for speeding up the AE control. AE control mechanism analyzes the low-resolution images to find an optimal exposure value, which determines exposing setting for the current scene. Then, the image sensor array is configured to output high-resolution images as final outputs once the optimal exposure value has been found. This is because smaller images can be read and analyzed faster. To speed up the AE control, the image sensor array is also configured to use short exposure times (as well as high gain) when outputting the low-resolution images.

However, short exposure times may cause less accurate and unstable AE control in a scene that is illuminated by an AC-powered artificial light source. Since the light source may operate at a particular frequency (e.g. 100 Hz or 120 Hz) and the intensity of the light source may vary within a period of the light source (referred to as light flicker), an exposure time shorter than one period of the light source can cause brightness fluctuation between the captured low-resolution images. As a result, the exposure value determined by the AE control mechanism based on the low-resolution images is not an optimal exposure value for the current scene of high-resolution images with relatively long exposure times. In the worst case, unstable exposure values are determined for outputting high-resolution images and there could be visible flickering between the outputted high-resolution images. In view of above, it is necessary to provide a method to improve the AE control mechanism.

SUMMARY OF THE INVENTION

With this in mind, it is one object of the present invention to provide an automatic exposure (AE) control mechanism for an image capturing device used in a surveillance camera system or a motion-activated device. Embodiments of the present invention relies on context switching to fast configure the image capturing device to provide captured images for different purposes, such as, image capturing or scene sensing (e.g. illumination estimation). Specifically, the image capturing device can be configured by one context to output high-resolution and high-quality images for image capturing, while configured by another context to output low-resolution images for illumination estimation. Moreover, the present invention also provides different AE control strategies to adapt to different scenarios (e.g., different illumination conditions). According to various embodiments of the present invention, the image capturing device could use different convergence zones for exposure control and context switch. As such, the present invention proposes an AE control mechanism that provides accurate exposure result in a short period of time as well as great adaptability for different scenarios.

According to one embodiment, an image capturing device that is operated according to a startup signal is provided. The image capturing device comprises: an image sensor array, a context switch control unit and an exposure control unit. The image sensor array is configurable by a first context to output a high-resolution image with a relatively long exposure time to a post-device, and by a second context to output one or more low-resolution images with relatively short exposure times in order to update an exposure value based on the low-resolution images. The context switch control unit is arranged to switch the first context to the second context based on the high-resolution image and a wide convergence zone. The exposure control unit is configurable by the contexts, and arranged to update the exposure value based on a narrow convergence zone to configure the image sensor array.

According to one embodiment, a method for controlling an image capturing device is provided. The image capturing device is operated according to a startup signal and comprises: configuring an image sensor array of the image capturing device by a first context to output a high-resolution image with a relatively long exposure time to a post-device; switching the first context to a second context based on the high-resolution image and a wide convergence zone; configuring the image sensor array by the second context to output one or more low-resolution images with relatively short exposure times in order to update an exposure value based on the low-resolution images; and updating the exposure value based on a narrow convergence zone to configure the image sensor array.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Overview

Figure 1:
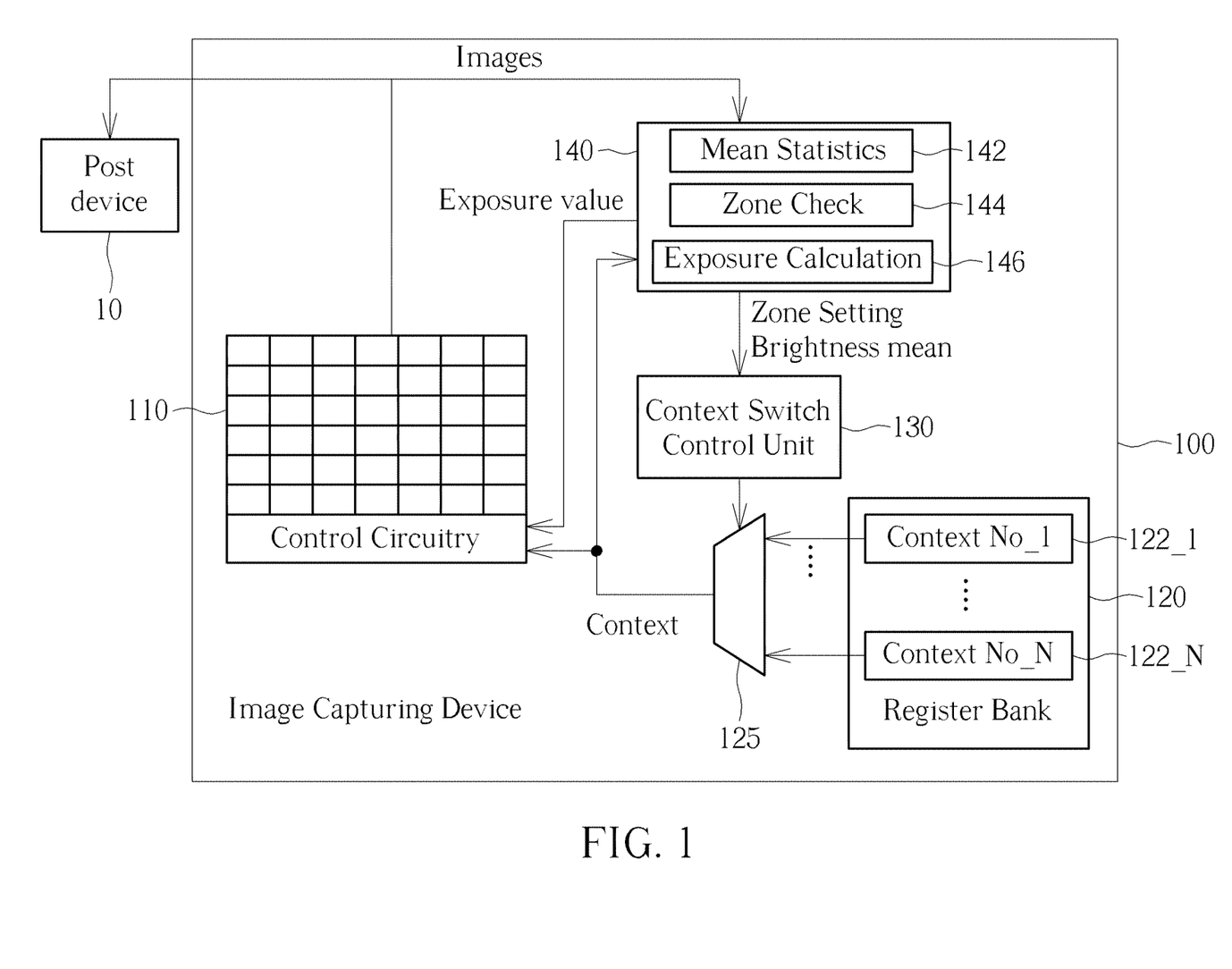
FIG. 1 illustrates a schematic diagram of an image capturing device according to one embodiment of the present invention.

Please refer to FIG. 1, which illustrates an image capturing device according to one embodiment of the present invention. As illustrated, an image capturing device 100 comprises an image sensor array 110, a register bank 120, a context switch control unit 130 and an exposure control unit 140. According to various embodiments of the present invention, the register bank 120, the context switch control unit 130 and the exposure control unit 140 can be integrated and implemented on a single processor or discrete ICs.

The image capturing device 100 could be used in a surveillance system or a motion-activated lighting system. According to various embodiments, the image capturing device 100 could be used to provide high-quality images to a post device 10, wherein the post device could use the high-quality images in image recognition or a variety of applications.

Figure 2:
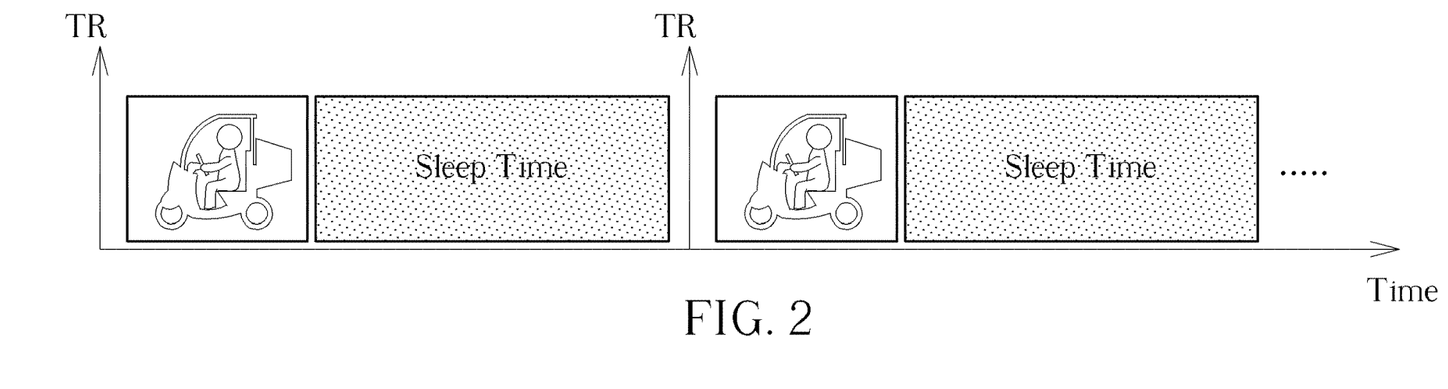
FIG. 2 illustrates operating timing of the image capturing device according to one embodiment of the present invention.

Please refer to FIG. 2 for further details. As shown by FIG. 2, the image capturing device 100 could be periodically operated at a low power/sleep mode, and only be activated in a short period of time to output captured images after receiving a startup signal. According to various embodiments, the startup signal could be generated by a reference clock source. For example, the startup signal could activate the image capturing device 100 to output a captured image every few seconds or at a frame rate (e.g. 1, 5, or 10 fps) that is much lower than a common frame rate of 30 fps. In the case of the surveillance system, a motion detecting system (not shown) could determine whether an object exists or moves in a scene by analyzing the outputted captured images. Once it is found that the object exists or moves in the scene, the image capturing device 100 could operate at a normal mode, outputting captured images at a common frame rate of 30 fps to completely record the motion of the object in the scene. In the case of the motion-activated lighting system, once it is found that the object exists or moves in the scene, a light source can be therefore turned on. In this way, the surveillance system or motion-activated lighting system can be more energy-efficient.

The image capturing device 100 relies on context switching to fast switch between different configurations, so as to provide images for different purposes. Each context indicates a unique combination of settings for multiple components in the image capturing device 100, such as, the image sensor array 110, the context switch control unit 130 and the exposure control unit 140. The following table shows settings in an exemplary context used by the present invention:

| Context No. | K |
|---|---|
| Image Resolution | Low/High |
| Max. Exposure Time | Short/Long |
| Zone Selection | Wide/Normal |
| Switching Condition | According to frame count or brightness mean |

"Image resolution" indicates a setting regarding a size of images outputted by the image sensor array 110. "Max. Exposure Time" indicates a setting regarding a maximum exposure time used by the image sensor array 110 to capture a single image. "Zone Selection" indicates settings regarding a width of a convergence zone for AE control that is used by the exposure control unit 140 as well as settings regarding a width of a convergence zone for determining when to switch the context that is currently used by the context switch control unit 130. "Switching condition" indicates a setting regarding when the context switch control unit 130 switches from one context to another context. Please note that there could be other settings in a context for configuring the image capturing device 100, such as, a frame rate, according to various embodiments of the present invention.

The image sensor array 110 comprises a plurality of pixel circuits arranged in a matrix form, which could be a CCD or CMOS image sensor. Sensed signal of the pixel circuits is read out to generate a captured image. Based on the "Image resolution" configured by one of the contexts, the image sensor array 110 may output either a high-resolution image for image capturing or a low-resolution image for scene sensing, such as estimating illumination of a scene. In addition, a number of images that are outputted by the image sensor array 110 under a currently selected context will be counted. Such information may be further referred to when determining whether to switch the context.

The register bank 120 comprises a plurality of registers, where multiple register sets 122_1-122_N in the register bank 120 store different contexts. One of the contexts stored in the register sets 122_1-122_N can be loaded to configure the image sensor array 110, the context switch control unit 130 and the exposure control unit 140. Selection of the multiple register sets 122_1-122_N is determined by a multiplexer 125 that is controllable by the context switch control unit 130.

The exposure control unit 140 comprises a mean statistics module 142, a zone check module 144 and an exposure calculation module 146. The mean statistics module 142 is arranged to calculate a brightness mean ME_K of a captured image. The zone check module 144 is arranged to check whether the calculated brightness mean ME_K falls within in a convergence zone, wherein the convergence zone defines a range of brightness. By comparing the brightness mean with an upper bound and a lower bound defined by the convergence zone, it can be understood whether an exposure value used by the image capturing device 100 can expose the current scene properly.

According to the checking result generated by the zone check module 144, the exposure calculation module 146 would determine whether to update the current exposure value or not. If the brightness mean ME_K of a captured image does not fall within the convergence zone, the exposure control unit 140 would update the exposure value. If the brightness mean is higher than a target value TV, the exposure calculation module 146 would update the current exposure value by decreasing its level. If the brightness mean is lower than the target value TV, the exposure calculation module 146 would update the current exposure value by increasing its level. Once the exposure value is updated, a new gain setting and a new exposure time setting can be determined and thus used to configure the image sensor array 110.

Figure 3:
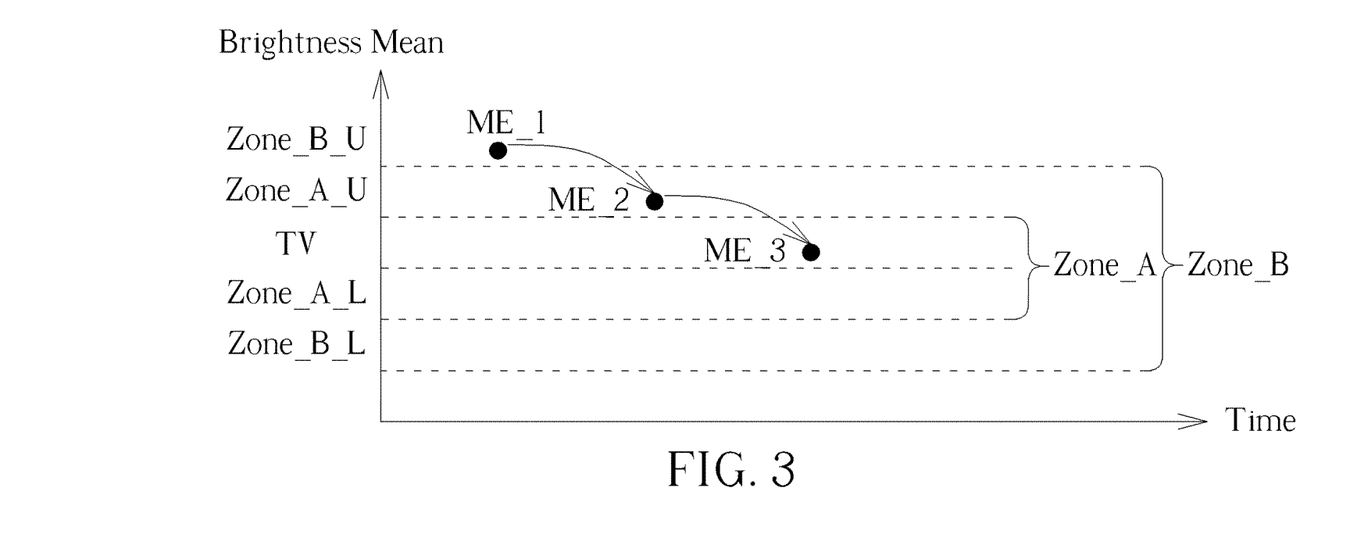
FIG. 3 illustrates convergence zones for exposure control in the image capturing device according to one embodiment of the present invention.

Please refer to FIG. 3, which illustrates how and when the exposure control unit 140 updates the exposure value. In a case shown by FIG. 3, the brightness mean ME_1 of a first captured image does not fall within a convergence zone Zone_A (having an upper bound Zone_A_U and a lower bound Zone_A_L). Thus, the exposure calculation module 146 decides to update the exposure value. As the brightness mean ME_1 is higher than the target value TV, the exposure calculation module 146 adjusts the exposure value from a higher level to a lower level. Once the exposure calculation module 146 starts to update the exposure value, it will continually adjust the exposure value until the brightness mean ME_3 falls within the convergence zone Zone_A. In short, the exposure control unit 140 starts the AE control when the brightness mean of the captured image does not fall within the convergence zone Zone_A, and stops the AE control when the brightness mean of the captured image falls within the convergence zone Zone_A.

Information regarding the brightness mean calculated by and the convergence zones used by the exposure control unit 140 would be sent to the context switch control unit 130. The context switch control unit 130 could use such information to determine whether to switch one context from another. According to various embodiments of the present invention, one or more convergence zones used by the exposure control unit 140 for determining when to start or stop the AE control could be different from the convergence zone used by the context switch control unit 130 for determining when to switch the context (which will be illustrated later). Moreover, the context switch control unit 130 could also rely on the number of images that are outputted under the configuration of a selected context to determine whether to switch one context from another.

Embodiment I

Figure 4A:
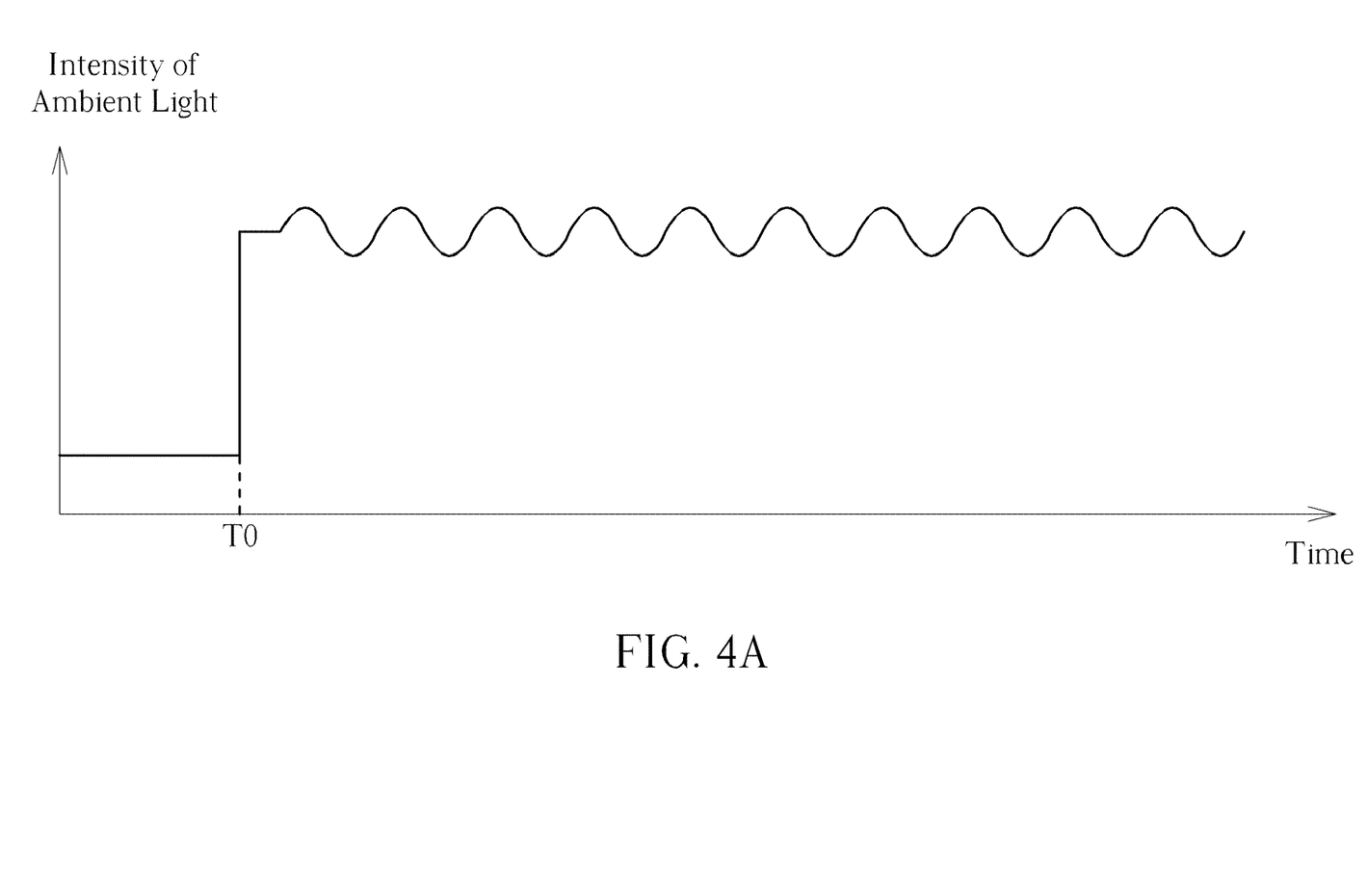
FIGS. 4A and 4B illustrate how to perform exposure control with context switching in the image capturing device according to a first embodiment of the present invention.
Figure 4B:
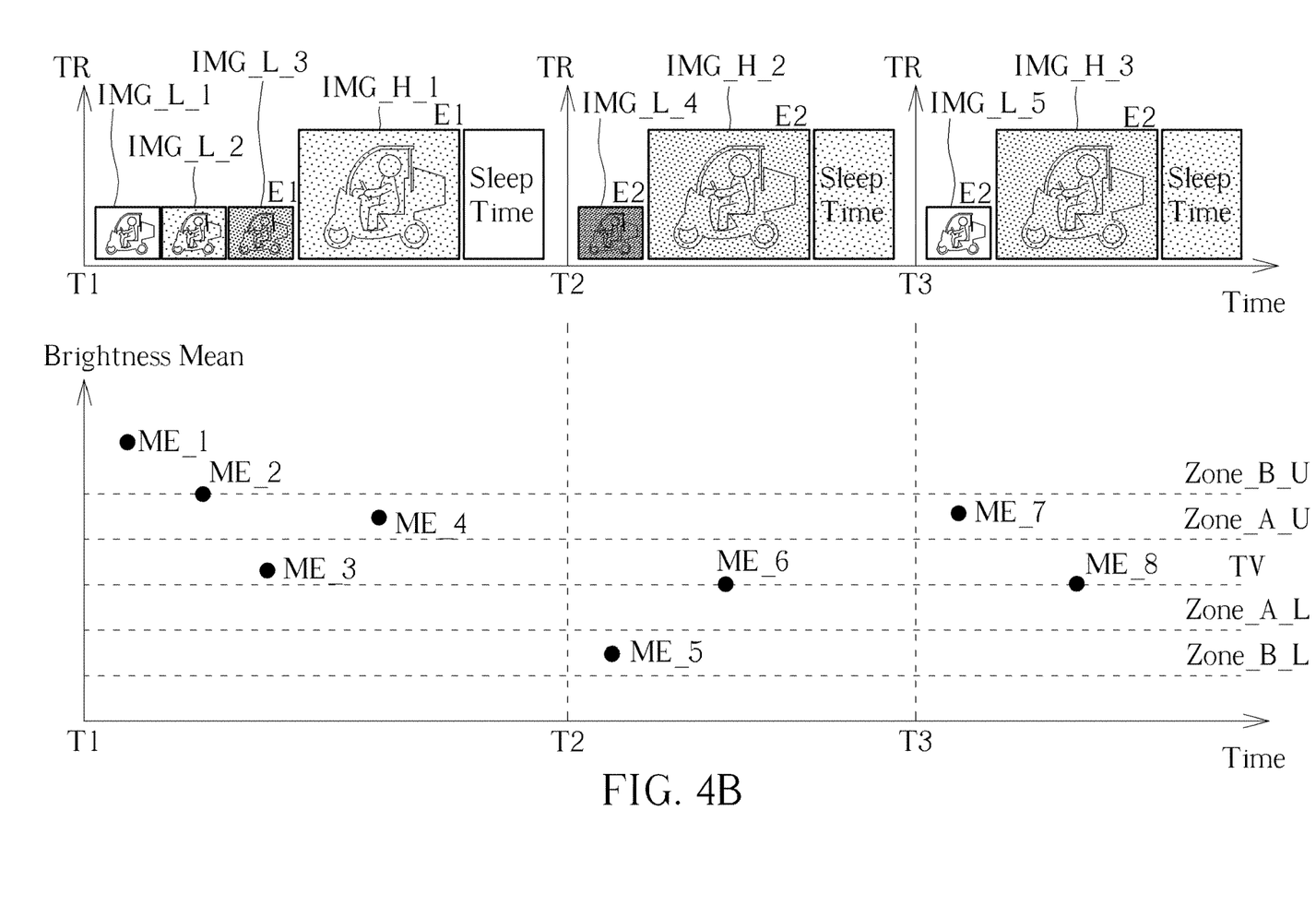

Please refer to FIG. 4A and FIG. 4B, which illustrate a scenario and operations of a first embodiment of the present invention. FIG. 4A illustrates an intensity of an ambient light of a scene and corresponding calculated brightness means of captured images. In the case, the ambient light is an AC-powered artificial light. For example, an AC-powered artificial light could be a fluorescent lamp or a LED light source. After the AC-powered artificial light is turned on at time T0, its intensity continually varies at a particular frequency (e.g. 100 Hz or 120 Hz) due to AC-powered. Thus, the present invention provides the following control mechanism to perform a fast and flicker-immune AE control. The image capturing device 100 is woken up to perform AE control iteratively by low-resolution images until the exposure value is optimized, and outputs a high-resolution image to a post-device (not shown) finally based on the optimized exposure value. Then the image capturing device 100 enters the sleep state.

| Context No. | 1 | 2 |
|---|---|---|
| Image Resolution | Low | High |
| Max. Exposure Time | Short | Long |
| Zone for AE stop | Within Zone_B | Within Zone_A |
| Switching Condition | ME_K within Zone_B or Fcount_1 ≥ N | Fcount_2 ≥ 1 |

In the first embodiment, a context No_1 will be firstly selected by the context switch control unit 130 from contexts stored in the register sets 122_1-122_N, where the context No_1 could configure the image sensor array 110 to output low-resolution images that are captured with relatively short exposure times. The low-resolution images can be read and analyzed faster, thereby speeding up the AE control, such that the time to find a proper exposure value can be shortened.

In addition, the context No_1 configures the exposure control unit 140 to use a wider convergence zone Zone_B (having an upper bound Zone_B_U and a lower bound Zone_B_L) to determine when to start and stop the AE control. The context No_1 also configures the context switch control unit 130 to use the wider convergence zone Zone_B to determine when to switch the context.

Under the configuration of the context No_1, the context switch control unit 130 would switch to a context No_2 of the contexts stored in the register sets 122_1-122_N if a brightness mean of a low-resolution image falls within the wider convergence zone Zone_B. Once the brightness mean of the low-resolution image falls within the wider convergence zone Zone_B, this means the exposure control unit 140 has found a suboptimal exposure value, which is an approximate value of an optimal exposure value that is able to expose the high-resolution image of the current scene properly. Thus, the context switch control unit 130 switches to the context No_2, allowing the image sensor array to output a high-resolution image as a final output.

On the other hand, if the exposure control unit 140 fails to find the optimal exposure value for a long time, the context switch control unit 130 would also switch to a context No_2. That is, the context switch control unit 130 would switch to the context No_2 if a frame count Fcount_1 (i.e., a number of images that are outputted under the configuration of the context No_1) is greater than or equal to N. In other words, the context switch control unit 130 could allow the exposure control unit 140 to stop the AE control and the image capturing device 100 is forced to output the high-resolution image no matter whether the brightness mean of the low-resolution image falls within the wider convergence zone Zone_B, thereby avoiding the sleep time of the image capturing device 100 from being suppressed.

Once the context No_2 is selected, the image sensor array 110 is configured to output one high-resolution image that is captured with a relatively long exposure time. In addition, the context No_2 configures the exposure control unit 140 to use the convergence zone Zone_A (having an upper bound Zone_A_U and a lower bound Zone_A_L) that is narrower than Zone_B, to determine whether to start and stop the AE control. By using the high-resolution image that is captured with a relatively long exposure time, the AE control is able to further fine-tune the suboptimal exposure value determined in a short period of time during the context No_1. Since the exposure time of the high-resolution image is allowed to be integer multiple of the period of the light source, an optimal exposure value can be determined without affecting by the intensity variation of the light source. Under the configuration of the context No_2, the context switch control unit 130 would switch back to the context No_1 if a frame count Fcount_2 (i.e., a number of images that are outputted under the configuration of the context No_2) is greater than or equal to 1. This means once a high-resolution captured image is outputted, the context switch control unit 130 switches back to the context No_1. After the image sensor array 110 outputs the high-resolution captured image, the image capturing device 100 will enter a sleep state until woken up by a startup signal.

Please refer to FIG. 4B for further details. The image capturing device 100 is woken up by the startup signal TR at time T1. At the time T1, the image capturing device 100 will be configured by the context No_1, such that the image sensor array 110 outputs a low-resolution image IMG_L_1. The exposure control unit 140 analyzes the low-resolution image IMG_L_1 to obtain the brightness mean ME_1. In the case of FIG. 4B, a brightness mean ME_3 of a low-resolution image IMG_L_3 falls within the wider convergence zone Zone_B until the exposure control unit 140 updates the exposure value twice to obtain an exposure value E1.

As the brightness mean ME_3 of the low-resolution image IMG_L_3 falls within the convergence zone Zone_B, the context switch control unit 130 decides to switch to the context No_2. At the same time, the exposure control unit 140 also stops the AE control as the brightness mean ME_3 has fallen within the convergence zone Zone_B. Once the context switch control unit 130 switches to the context No_2, the image sensor array 110 outputs a high-resolution image IMG_H_1. The image sensor array 110 will relies on the exposure value E1 to output the high-resolution image IMG_H_1. Please note that even though the low-resolution image IMG_L_3 and the high-resolution image IMG_H_1 are both outputted based on the exposure value E1, gain settings of the image sensor array 110 are different. This is because the low-resolution image is captured with short exposure time, while the high-resolution image is captured with long exposure time. The gain settings need to be different from each other to meet the same exposure value E1.

As a brightness mean ME_4 of the high-resolution image IMG_H_1 fails to fall within the narrower convergence zone Zone_A due to the exposure value E1 found during the context No_1, the exposure control unit 140 starts the AE control and updates the current exposure value from E1 to E2. In addition, the context switch control unit 130 switches back to the context No_1 after the image sensor array 110 outputs the high-resolution image IMG_H_1. Accordingly, the image capturing device 100 enters the sleep state.

At time T2, the image capturing device 100 is woken up by the startup signal TR, and the image capturing device 100 is now configured by the context No_1, which allows the image sensor array 110 to output the low-resolution image IMG_L_4. In addition, the image sensor array 110 generates the low-resolution image IMG_L_4 based on the exposure value E2. As a brightness mean ME_5 of the low-resolution image IMG_L_4 falls within the wider convergence zone Zone_B, the exposure control unit 140 will not start the AE control and the exposure value remains E2. By using the wider convergence zone Zone_B, the brightness fluctuation due to intensity variation of the AC-powered artificial light will not affect the exposure value E2 found by using the high-resolution image IMG_H_1. On the other hand, the context switch control unit 130 switches to the context No_2 as the brightness mean ME_5 falls within the wider convergence zone Zone_B.

After the context No_2 is selected, it configures the image sensor array 110 to output a high-resolution image IMG_H_2. The image sensor array 110 outputs a high-resolution image IMG_H_2 based on the exposure value E2. As a brightness mean ME_6 of the high-resolution image IMG_H_2 falls within the narrower convergence zone Zone_A, the exposure control unit 140 will not start the AE control and the exposure value remains E2. In addition, the context switch control unit 130 switches back to the context No_1 after the image sensor array 110 outputs the high-resolution image IMG_H_2. Accordingly, the image capturing device 100 enters the sleep state.

At time T3, the image capturing device 100 is again activated according to the startup signal TR, and the image capturing device 100 is configured by the context No_1, which allows the image sensor array 110 to output a low-resolution image IMG_L_5. The image sensor array 110 still relies on the exposure value E2 to generate the low-resolution image IMG_L_5. As a brightness mean ME_7 of the low-resolution image IMG_L_5 falls within the convergence zone Zone_B, the exposure control unit 140 will not start the AE control and the exposure value remains E2. On the other hand, the context switch control unit 130 switches to the context No_2 since the brightness mean ME_7 falls within the convergence zone Zone_B. After the context No_2 is selected, it configures the image sensor array 110 to output a high-resolution image IMG_H_3. The image sensor array 110 relies on the exposure value E2 to generate the high-resolution image IMG_H_3. As a brightness mean ME 8 of the high-resolution image IMG_H_3 falls within the narrower convergence zone Zone_A, the exposure control unit 140 will not start the AE control, which allows the exposure value to remain E2. Accordingly, the context switch control unit 130 switches back to the context No_1 and the image capturing device 100 enters the sleep state.

Since the wider convergence zone Zone_B is used by the context No_1, the brightness fluctuation (e.g. ME_5, ME_7) due to intensity variation of the AC-powered artificial light will not affect the optimal exposure value E2 found by using the high-resolution image IMG_H_1, thereby to avoid unstable exposure value applied to the high-resolution images IMG_H_2 and IMG_H_3.

In this embodiment, under the configuration of the context No_1, the exposure control unit 140 uses the wider convergence zone Zone_B to determine whether to start the AE control, such that the exposure control can be immune to intensity variation of the AC-powered artificial light, which can keep the exposure value more stable. As a result, overall brightness of the high-resolution images (as final output) can be more consistent. Alternatively, under the configuration of the context No_2, the exposure control unit 140 uses the convergence zone Zone_A to determine whether to start the AE control, such that the exposure control can find the optimal exposure value for the high-resolution image of the current scene. On the other hand, under the configuration of the context No_1, the context switch control unit 130 uses the wider convergence zone Zone_B to determine whether to keep at the context NO_1 for fast AE control once abrupt light change occurs.

Embodiment II

Figure 5:
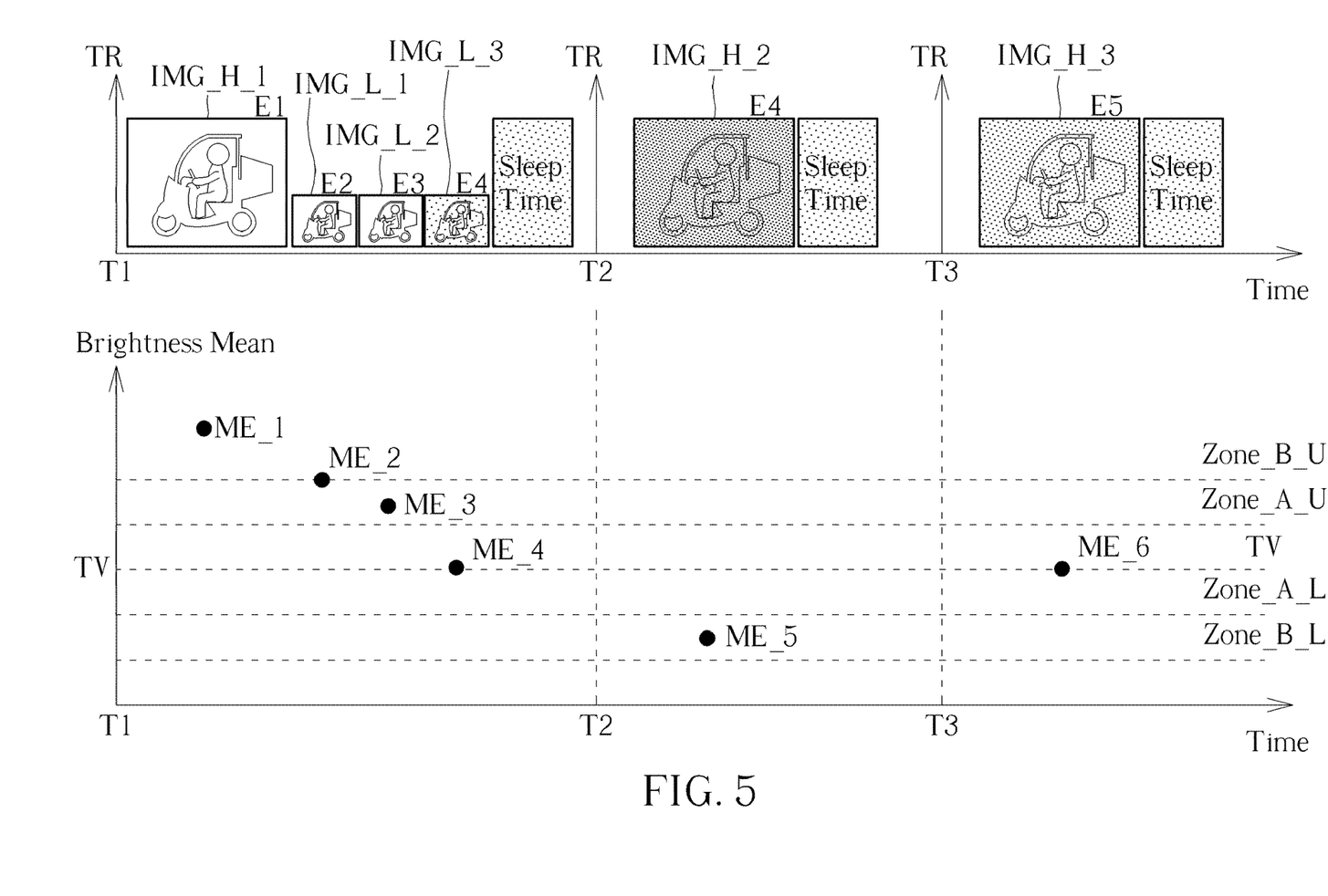
FIG. 5 illustrates how to perform exposure control with context switching in the image capturing device according to a second embodiment of the present invention.

Please refer to and FIG. 5, which illustrate a scenario and operations of a second embodiment of the present invention. The image capturing device 100 is woken up to output a high-resolution image to a post-device firstly, and then perform AE control iteratively by low-resolution images until the exposure value is optimized. Then the image capturing device 100 enters the sleep state, and the optimized exposure value is stored for the next high-resolution image.

| Context No. | 3 | 4 |
|---|---|---|
| Image Resolution | High | Low |
| Max. Exposure Time | Long | Short |
| Zone for AE stop | Within Zone_A | Within Zone_A |
| Switching Condition | ME_1 not within Zone_B | ME_K within Zone_A or Fcount_4 ≥ N |

In this embodiment, a context No_3 will be firstly selected by the context switch control unit 130 from contexts stored in the register sets 122_1-122_N, wherein the context No_3 will configure the image sensor array 110 to output a high-resolution image that is captured with a relatively long exposure time. The high-resolution image will be outputted to a post-device (not shown). In addition, the context No_3 will also configure the exposure control unit 140 to use a narrower convergence zone Zone_A for determine whether to start and stop the AE control. The context No_3 also configures the context switch control unit 130 to use a wider convergence zone Zone_B to determine when to switch the context.

The context switch control unit 130 would switch to a context No_4 from the contexts stored in the register sets 122_1-122_N if a brightness mean of the high-resolution image does not fall within the convergence zone Zone_B. This means the current exposure value can be far from the optimal exposure value for the current scene. Therefore, the fast AE control is necessary. In order to speed up the AE control, the context No_4 is used since it configures the image sensor arrays 110 to output smaller images that can be read and analyzed faster.

Once the context No_4 is selected, it will configure the image sensor array 110 to output low-resolution images with relatively short exposure times. In addition, the context No_4 will configure the exposure control unit 140 to use the narrower convergence zone Zone_A to determine whether to start and stop the AE control. The context No_4 also configures the context switch control unit 130 to use the narrower convergence zone Zone_A to determine when to switch the context.

Under the configuration of context No_4, the context switch control unit 130 would switch back to the context No_3 if the brightness mean of the low-resolution image falls within the convergence zone Zone_A, which means the exposure control unit 140 has found an optimal exposure value, which is an approximate value of an optimal exposure value that is able to expose the high-resolution image of the current scene properly. Also, the context switch control unit 130 would switch back to the context No_3 if a frame count Fcount_4 (i.e., a number of images that are outputted under the configuration of context No_4) is greater than or equal to N, which is intended to limit the time consumed by the AE control, thereby avoiding the sleep time of the image capturing device 100 from being suppressed.

Please refer to FIG. 5 for further details. The image capturing device 100 is woken up by the startup signal TR at time T1. At the time T1, the image capturing device 100 will be configured by the context No_3, such that the image sensor array 110 outputs a high-resolution images IMG_H_1 to a post-device for applications. The exposure control unit 140 analyzes the high-resolution images IMG_H_1 to obtain a brightness mean ME_1. As the brightness mean ME_1 of the high-resolution image IMG_H_1 does not fall within the wider convergence zone Zone_B, the context switch control unit 130 switches to the context No_4 for fast AE control. In addition, as the brightness mean ME_1 of the high-resolution image IMG_H_1 does not fall within the convergence zone Zone_A, the exposure control unit 140 also determines to start the AE control and updates the exposure value from E1 to E2.

Once the context No_4 is selected, the image sensor array 110 starts to output low-resolution images that are captured with short exposure times. The exposure control unit 140 calculates the brightness mean and accordingly updates the exposure value. In the case of FIG. 5B, a brightness mean ME_4 of a low-resolution image IMG_L_3 falls within the convergence zone Zone_A until the exposure control unit 140 updates the exposure value to E4. Once the brightness mean ME_4 of the low-resolution image IMG_L_3 falls within the convergence zone Zone_A, the exposure control unit 140 stops the AE control, which allows the exposure value to remain E4. In addition, the context switch control unit switches to the context No_3 as the brightness mean ME_4 falls within the convergence zone Zone_A. Accordingly, the image capturing device 100 enters the sleep state.

Due to intensity variation of the AC-powered artificial light, the brightness fluctuation between the captured low-resolution images prevents the AE control from finding the optimal exposure value. Thus, the AE control requires a high-resolution image that is captured with a relatively long exposure time to further fine-tune the suboptimal exposure value E4.

At time T2, the image capturing device 100 is activated according to the startup signal TR, and the image capturing device 100 is now configured by the context No_3, which allows the image sensor array 110 to output a high-resolution image IMG_H_2. The image sensor array 110 generates the high-resolution image IMG_H_2 based on the exposure value E4. As a brightness mean ME_5 of the high-resolution image IMG_H_2 fails to fall within the convergence zone Zone_A, the exposure control unit 140 would start the AE control, which updates the current exposure value from E4 to E5. On the other hand, the brightness mean ME_5 falls within the convergence zone Zone_B, the context switch control unit 130 will not switch the context. Accordingly, the image capturing device 100 enters the sleep state.

At time T3, the image capturing device 100 is again activated according to the startup signal TR, and the image capturing device 100 is configured by the context No_3, allowing the image sensor array 110 to output a high-resolution image IMG_H_3. The image sensor array 110 relies on the exposure value E5 to generate the high-resolution image IMG_H_3. As a brightness mean ME_6 of the high-resolution image IMG_H_3 falls within the convergence zone Zone_A, it is unnecessary for the exposure control unit 140 to start the AE control and to update the current exposure value. On the other hand, as the brightness mean ME_6 falls within the convergence zone Zone_B, the context switch control unit 130 will not switch the context. Accordingly, the image capturing device 100 enters the sleep state.

Since the wider convergence zone Zone_B is used by the context No_3, low-resolution images are captured only when there is abrupt change in the light intensity. As a result, less increase in power consumption due to capture of low-resolution images and the brightness fluctuation due to intensity variation of the AC-powered artificial light will not affect the optimal exposure value found based on the high-resolution images.

In this embodiment, under the configuration of the context No_3, the context switch control unit 130 uses the wider convergence zone Zone_B to determine whether to switch to the context NO_4, which can avoid the brightness fluctuation between the captured low-resolution images due to intensity variation of the AC-powered artificial light and reduce the probability of switching to the context No_4. In view of this, using the low-resolution images for fast AE control will only occur when the current exposure value is far from the optimal exposure value for the current scene (e.g. abrupt light change), such that the additional power consumption of the image capturing device 100 due to low-resolution image capture can be reduced.

Figure 6:
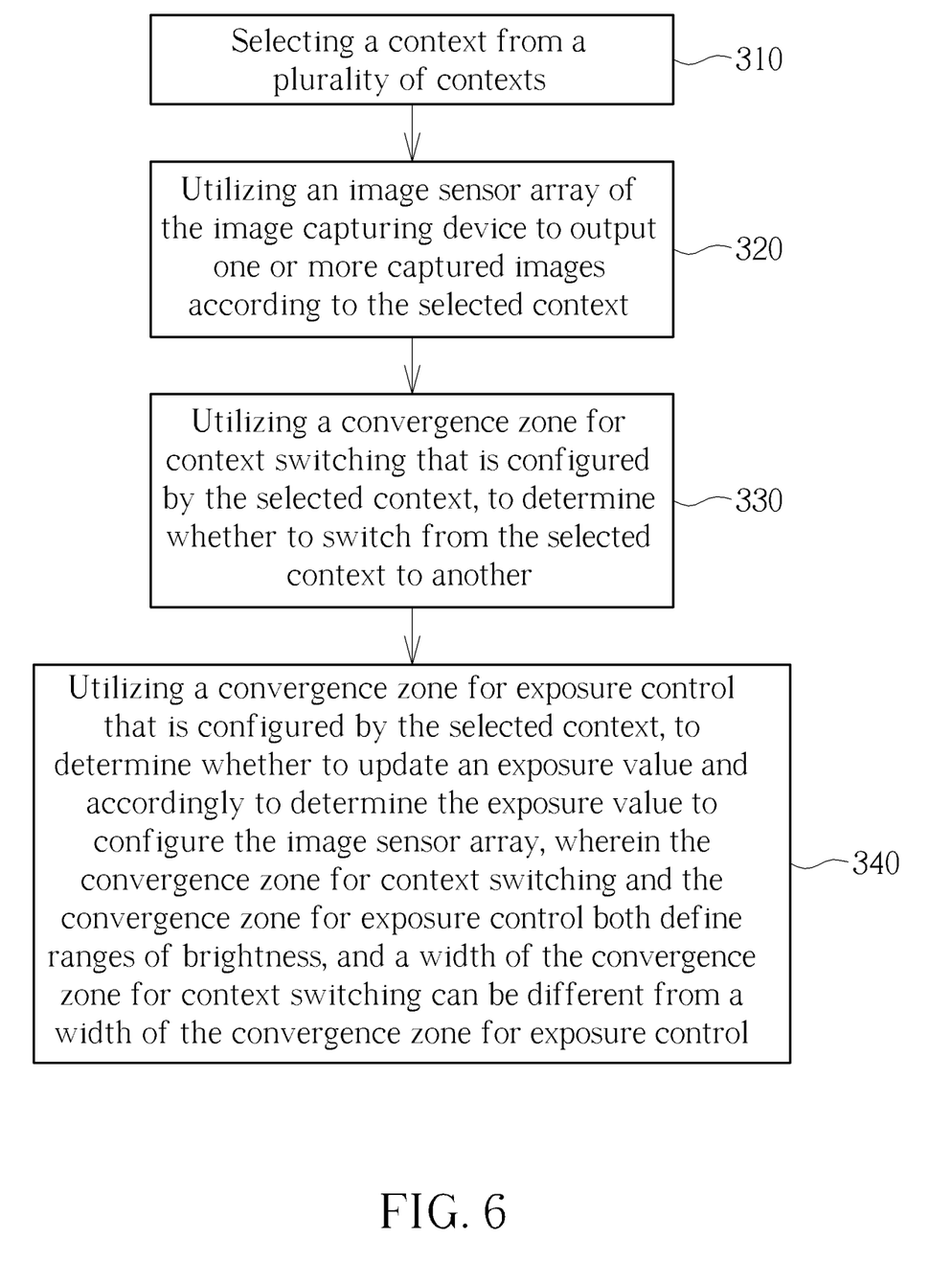
FIG. 6 illustrates a flow chart of a method of controlling an image capturing device according to one embodiment of the present invention.

FIG. 6 illustrates a simplified flowchart of a method of controlling an image capturing device with context switching, wherein the image capturing device is operated according to a startup signal. The method includes following steps:

Step 310: selecting a context from a plurality of contexts;

Step 320: utilizing an image sensor array of the image capturing device to output one or more captured images according to the selected context;

Step 330: utilizing a convergence zone for context switching that is configured by the selected context, to determine whether to switch from the selected context to another; and Step 340: utilizing a convergence zone for exposure control that is configured by the selected context, to determine whether to update an exposure value and accordingly to determine the exposure value to configure the image sensor array, wherein the convergence zone for context switching and the convergence zone for exposure control both define ranges of brightness, and a width of the convergence zone for context switching can be different from a width of the convergence zone for exposure control.

Since principles and specific details of the foregoing steps have been described and explained in detail with embodiments of the image capturing device 100, further descriptions regarding the processing method will not be repeated here. It should be noted that other additional steps may be added into the above flow to render the present invention.

In conclusion, the image capturing device of the present invention uses default contexts to improve the configurability, thereby to adapt to different scenarios. For example, the present invention can use the wider convergence zone for determining whether to start the AE control based on the low-resolution images for fast AE control, while use the narrower convergence zone for determining whether to start the AE control based on the high-resolution images to fine-tune the AE control results using the low-resolution images. Such configuration can allow the image capturing device to be more immune to intensity variation of the ambient light and to speed up the AE control. On the other hand, the present invention also configures the image sensor array to output the high-resolution image as the final output first and then selectively configures the image sensor array to output the low-resolution image for fast AE control. In such case, the sleep time of the image capturing device can be guaranteed, thereby improving the energy efficiency of the image capturing device.

Embodiments in accordance with the present invention can be implemented as apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capturing device that is operated according to a startup signal, comprising:
   an image sensor array, configurable by a first context to output a high-resolution image with a relatively long exposure time to a post-device, and by a second context to output one or more low-resolution images with relatively short exposure times in order to update an exposure value based on the one or more low-resolution images;
   a context switch control circuit, arranged to switch the first context to the second context based on the high-resolution image and a wide convergence zone; and
   an exposure control circuit, configurable by contexts including the first context and the second context, arranged to update the exposure value based on a narrow convergence zone to configure the image sensor array.

2. The image capturing device of claim 1, wherein the startup signal is generated based on a reference clock source and the image capturing device is periodically woken up by the startup signal from a sleep state.

3. The image capturing device of claim 1, wherein the context switch control circuit switches from the first context to the second context if a brightness mean of the high-resolution image outputted by the image sensor array does not fall within the wide convergence zone.

4. The image capturing device of claim 1, wherein the context switch control circuit switches from the second context to the first context if a brightness mean of one of the one or more low-resolution images outputted by the image sensor array falls within the wide convergence zone.

5. The image capturing device of claim 1, wherein the context switch control circuit switches from the second context to the first context if a number of the one or more low-resolution images that are outputted by the image sensor array is greater than a predetermined value.

6. The image capturing device of claim 1, wherein the image capturing device enters a sleep state, if a brightness mean of the high-resolution image or the low-resolution image is within the narrow convergence zone.

7. The image capturing device of claim 1, further comprising:
    a register bank, including a plurality of register sets, each arranged to store one of the contexts; and
    a multiplexer, coupled to the register bank and the context switch control circuit, controllable by the context switch control circuit to output a selected one of the contexts.

8. The image capturing device of claim 1, wherein the image sensor array is configured by the first context after the startup signal.

9. A method of controlling an image capturing device that is operated according to a startup signal, comprising:
    configuring an image sensor array of the image capturing device by a first context to output a high-resolution image with a relatively long exposure time to a post-device;
    switching the first context to a second context based on the high-resolution image and a wide convergence zone;
    configuring the image sensor array by the second context to output one or more low-resolution images with relatively short exposure times in order to update an exposure value based on the one or more low-resolution images; and
    updating the exposure value based on a narrow convergence zone to configure the image sensor array.

10. The method of claim 9, wherein the startup signal is generated based on a reference clock source and the image capturing device is periodically woken up by the startup signal from a sleep state.

11. The method of claim 9, further comprising:
    switching from the first context to the second context if a brightness mean of the high-resolution image outputted by the image sensor array does not fall within the wide convergence zone.

12. The method of claim 9, further comprising:
    switching from the second context to the first context if a brightness mean of one of the one or more low-resolution images outputted by the image sensor array falls within the wide convergence zone.

13. The method of claim 9, further comprising:
    switching from the second context to the first context if a number of the one or more low-resolution images that are outputted by the image sensor array is greater than a predetermined value.

14. The method of claim 9, further comprising:
    allowing the image capturing device to enter a sleep state if a brightness mean of the high-resolution image or the low-resolution image is within the narrow convergence zone.

15. The method of claim 9, further comprising:
    configuring the image sensor array by the first context after the startup signal.

* * * * *